United States Patent Office 3,341,535
Patented Sept. 12, 1967

3,341,535
BENZIMIDAZOLE DERIVATIVES
Teruya Seki, Tokyo, Manki Komatsu, Ichikawa, Yoshiaki Watanabe, Niiza-machi, and Michitada Sasajima and Yachiyo Matsuda, Tokyo, Japan, assignors to Taisho Pharmaceutical Co., Ltd., Tokyo, Japan
No Drawing. Filed Apr. 7, 1965, Ser. No. 446,415
25 Claims. (Cl. 260—247.1)

ABSTRACT OF THE DISCLOSURE

New and useful chemical compounds are provided. The compounds have the general formulae:

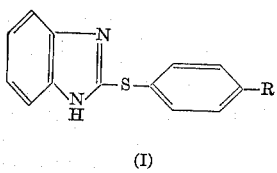   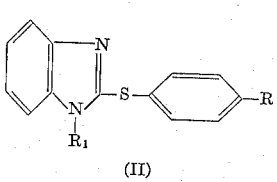

(I)   (II)

wherein R represents halogen (e.g. Cl, Br) or lower alkyl (a.g. methyl, ethyl, propyl, isopropyl, butyl, etc.), lower alkoxy (e.g. methoxy, ethoxy, propoxy, etc.), lower alkyl amino (e.g. methylamino, ethylamino, etc.) or di(lower) alkyl amino (e.g. dimethylamino, diethylamino, etc.) and $R_1$ represents di(lower)alkylaminoethyl or morpholinoethyl.

The compounds of Formula II possess analgesic activity. The compounds of Formula I are useful as intermediates in the preparation of those compounds of Formula II.

---

The present invention relates to novel benzimidazole derivatives and to the preparation thereof.

More particularly, it relates to novel 1-basically-substituted alkyl-2-arylthio-benzimidazoles having powerful analgesic action, and also to intermediates thereof.

The compounds of this invention have the general formulae:

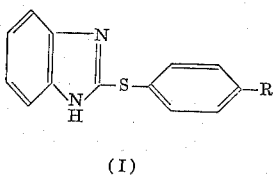   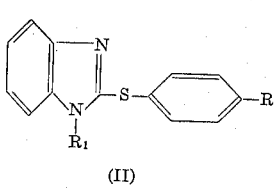

(I)   (II)

wherein R represents halogen (e.g. Cl, Br) or lower alkyl (e.g. methyl, ethyl, propyl, isopropyl, butyl, etc.), lower alkoxy (e.g. methoxy, ethoxy, propoxy, etc.), lower alkyl-amino (e.g. methylamino, ethylamino, etc.) or di(lower) alkylamino (e.g. dimethylamino, diethylamino, etc.) and $R_1$ represents di(lower)alkylaminoethyl or morpholinoethyl.

The present invention also includes the preparation of the aforesaid novel compounds. The Compounds I can be prepared by the reaction of 2-chlorobenzimidazole with the corresponding potassium thiophenolates in alcohol at elevated temperature as illustrated by the following equation:

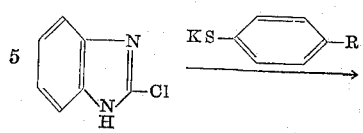

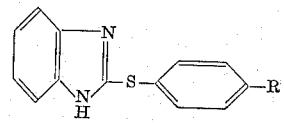

(I)

wherein R is as precedingly defined.

The Compounds I prepared by the above procedure are intermediates of the Compounds II, and may be reacted with a suitable alkaline material such as sodium metal, sodium amide or potassium hydroxide in a solvent such as xylene, dioxane, toluene or a mixture of two or more of such solvents.

The reaction mixture can be treated with the corresponding basically substituted alkyl chloride. The reaction is illustrated as follows:

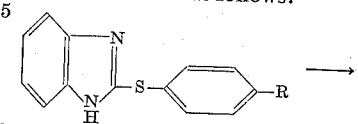

(I)

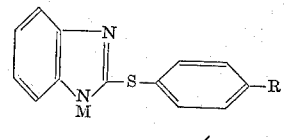

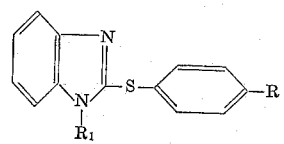

(II)

wherein R and $R_1$ are as precedingly defined and M represents sodium or potassium.

Thus-obtained Compounds II, 1-basically-substituted-alkyl-2-arylthiobenzimidazoles, exhibit valuable pharmaceutical properties and are useful as analgesics.

2-chlorobenzimidazoles used for the preparation of the composition of this invention can be prepared as described in Beilstein 23, 133.

The following examples of presently preferred embodiments of the invention are given for the purpose of illustration and not by way of limitation. In these examples, "g." signifies grams, and "ml." signifies milliliters.

*Example 1.—2-(p-chlorophenylthio)benzimidazole*

To a solution of 3.2 g. of potassium hydroxide in 50 ml. of ethanol is added 8.0 g. of p-chlorothiophenol at elevated temperature (e.g. 40–50 ° C.) and the resulting potassium salt is reacted with 8.5 g. of 2-chlorobenzimidazole dissolved in 70 ml. of ethanol. The reaction mixture is refluxed for two hours in an atmosphere of nitrogen gas to avoid oxidation. Then the solvent is distilled off, the residual solid is washed with water and recrystallized from ethanol, giving 2-(p-chlorophenylthio)benzimidazole, as white needles melting at 221–223° C. The yield amounts to 11.4 g. (78.3%).

*Analysis.*—Calcd. for $C_{13}H_9ClN_2S$: 10.74%. Found: 10.71% N.

Example 2

While substituting p-bromothiophenol for p-chlorothiophenol in Example 1 and otherwise proceeding after the manner set forth in said example, there is obtained 3-(p-bromophenylthio)benzimidazole, white prisms melting at 224.5–225.5° C. The yield is 76.1%.

*Analysis.*—Calcd. for $C_{13}H_9BrN_2S$: 9.15% N. Found: 8.99% N.

Example 3.—2-(p-methylphenylthio)benzimidazole

To a solution of 6.0 g. of potassium hydroxide in 100 ml. of ethanol is added 12.4 g. of p-thiocresol and the resulting potasisum salt is treated with 15.3 g. of 2-chlorobenzimidazole dissolved in 150 ml. of ethanol at elevated temperature (e.g. 60–70° C.). The thus-obtained mixture is refluxed for five hours. Then the solvent is distilled off and the residue is crystallized from ethanol giving 2-(p-methylphenylthio)benzimidazole, as white needles melting at 194–195° C. The yield amounts to 17.5 g. (73.0%).

*Analysis.*—Calcd. for $C_{14}H_{12}N_2S$: 11.65% N. Found: 11.77% N.

The compounds according to the following Examples 4 to 10 are obtained from 2-chlorobenzimidazole and the corresponding p-alkylthiophenols respectively by the method of the present Example 3:

Example 4

From p-ethylthiophenol, there is obtained 2-(p-ethylphenylthio)benzimidazole in the form of white needles melting at 185.5–186.5° C. The yield is 71.6%.

*Analysis.*—Calcd. for $C_{15}H_{14}N_2S$: 11.02% N. Found: 11.33% N.

Example 5

From p-propylthiophenol, there is obtained 2-(p-propylphenylthio)benzimidazole in the form of white needles melting at 158.0–159.5° C. The yield is 45.2%.

*Analysis.*—Calcd. for $C_{16}H_{16}N_2S$: 10.44% N. Found: 10.42% N.

Example 6

From p-isopropylthiophenyl, there is obtained 2-(p-isopropylphenylthio)benzimidazole in the form of white needles melting at 200–201° C. The yield is 55.0%.

*Analysis.*—Calcd. for $C_{16}H_{16}N_2S$: 10.44% N. Found: 10.58% N.

Example 7

From p-butylthiophenol, there is obtained 2-(p-butylphenylthio)benzimidazole in the form of white needles melting at 143.5–144.5° C. The yield is 71.0%.

*Analysis.*—Calcd. for $C_{17}H_{18}N_2S$: 9.92% N. Found: 9.67% N.

Example 8

From p-isobutylthiophenol, there is obtained 2-(p-isobutylphenylthio)benzimidazole in the form of white needles melting at 173.0–174.5° C. The yield is 59.3%.

*Analysis.*—Calcd. for $C_{17}H_{18}N_2S$: 9.92% N. Found: 9.99% N.

Example 9

From p-sec.-butylthiophenol, there is obtained 2-(p-sec.-butylphenylthio)benzimidazole in the form of white needles melting at 171.5–172.5° C. The yield is 75.2%.

*Analysis.*—Calcd. for $C_{17}H_{18}N_2S$: 9.92% N. Found: 9.91% N.

Example 10

From p-tert.-butylthiophenol, there is obtained 2-(p-tert.-butylphenylthio)benzimidazole in the form of white needles melting at 185.5–187.0° C. The yield is 64.5%.

*Analysis.*—Calcd. for $C_{17}H_{18}N_2S$: 9.92% N. Found: 9.92% N.

Example 11.—2-(p-methoxyphenylthio)benzimidazole

This compound is obtained from p-methoxythiophenol (12.2 g.), potassium hydroxide (4.7 g.) and 2-chlorobenzimidazole (13.2 g.) by the same procedure as that described in Example 3, in the form of white needles melting at 206.0–207.5° C. The yield amounts to 17.3 g. (77.5%).

*Analysis.*—Calcd. for $C_{14}H_{12}N_2OS$: 10.93% N. Found: 10.78% N.

The following compounds (of Examples 12 and 13) can be obtained from 2-chlorobenzimidazole and the corresponding p-alkoxythiophenols, respectively, by the method of Example 3.

Example 12

From p-ethoxythiophenol, there is obtained 2-(p-ethoxyphenylthio)benzimidazole in the form of white needles melting at 208.0–209.0° C. The yield is 64.9%.

*Analysis.*—Calcd. for $C_{15}H_{14}N_2OS$: 10.36% N. Found: 10.53% N.

Example 13

From p-propoxythiophenol, there is obtained 2-(p-propoxyphenylthio)benzimidazole in the form of white needles melting at 189.5–190.5° C. The yield is 49.5%.

*Analysis.*—Calcd. for $C_{16}H_{16}N_2OS$: 9.85% N. Found: 10.29% N.

Example 14.—2-(p-N-methylaminophenylthio)-benzimidazole

This compound is obtained from p-N-methylaminothiophenol (10.3 g.), potassium hydroxide (4.2 g.) and 2-chlorobenzimidazole (11.3 g.) by the same procedure as that described in Example 1, in the form of white needles melting at 201.5–202.5° C. The yield amounts to 5.2 g. (27.6%).

*Analysis.*—Calcd. for $C_{14}H_{13}N_3S$: 16.46% N. Found: 16.73% N.

The compounds of Examples 15 and 16 are obtained from 2-chlorobenzimidazole and the corresponding p-substituted-thiophenols, respectively, by the method of Example 1:

Example 15

From p-N-ethylaminothiophenol, there is obtained 2-(p-N-ethylaminophenylthio)-benzimidazole in the form of white needles melting at 194.0–194.5° C. The yield is 44.7%.

*Analysis.*—Calcd. for $C_{15}H_{15}N_3S$: 15.60% N. Found: 15.96% N.

Example 16

From p-N-propylaminothiophenol, there is obtained 2-(p-N-propylaminophenylthio)benzimidazole in the form of white needles melting at 186.0–187.0° C. The yield is 42.0%.

*Analysis.*—Calcd. for $C_{16}H_{17}N_3S$: 14.83% N. Found: 14.99% N.

Example 17.—2-(p-N,N-dimethylaminophenylthio)-benzimidazole

This compound is obtained from p-N,N-dimethylaminothiophenol (8.0 g.), potassium hydroxide (2.9 g.) and 2-chlorobenzimidazole (8.0 g.) by the same procedure as described in Example 1, in the form of white grains melting at 254.0–255.0° C. The yield amounts to 10.9 g. (81.0%).

*Analysis.*—Calcd. for $C_{15}H_{15}N_3S$: 15.60% N. Found: 15.39% N.

By substituting p-N,N-diethylaminothiophenol for p-N,N-dimethylaminothiophenol there is obtained 2-(p-N,N-diethylaminophenylthio)benzimidazole in the form of white needles melting at 186.0–186.5° C. The yield is 34.3%.

Analysis.—Calcd. for $C_{17}H_{19}N_3S$: 14.13% N. Found: 14.23% N.

Example 18.—1-(β-diethylaminoethyl)-2-phenylthiobenzimidazole 2-phenylthiobenzimidazole (6.8 g.) prepared by the procedure of Example 1 using thiophenol in place of p-chlorothiophenol is dissolved in 100 ml. of anhydrous dioxane. The resulting solution is treated with 1.5 g. of sodium amide at a temperature of about 60° C., and then stirred for 5 hours maintaining the temperature at between 60 and 70° C. To the reaction mixture is added dropwise 5 g. of β-diethylaminoethylchloride in 40 ml. of toluene during an hour and then the stirring and heating are continued further for 3 hours. After cooling, the precipitated sodium chloride is filtered off and then the filtrate is concentrated under reduced pressure. The residual oil is diluted with ether and the organic layer is extracted with two 30 ml. portions of 2.5% hydrochloric acid. The combined acid layer is made alkaline with sodium hydroxide solution and extracted again with ether. The ether extract is washed with water and dried over anhydrous magnesium sulfate and finally ether is distilled off. The residual 1-(β-diethylaminoethyl)-2-phenylthiobenzimidazole is pale yellow oil, boiling at 175–180° C./0.1 mm. Hg. The yield amounts to 7.4 g. (76.3%). The dipicrate (M.P. 192.0–194.0° C.) is subjected to analysis with the following results:

Calcd. for $C_{31}H_{29}N_9O_{14}S$: 47.51% C, 3.73% H, 16.09% N. Found: 47.58% C, 3.84% H, 15.74% N.

Example 19.—1-(β-diethylaminoethyl)-2-(p-chlorophenylthio)benzimidazole 2-(p-chlorophenylthio)benzimidazole (7 g.) prepared in Example 1 is dissolved in hot anhydrous dioxane. This solution is treated with 1.3 g. of sodium amide and stirred for 5 hours at 60–70° C. Then the reaction mixture has added thereto dropwise 4.1 g. of β-diethylaminoethylchloride in 3.5 ml. of toluene over the period of an hour and is further stirred for 3 hours at the same temperature. The precipitated sodium chloride is filtered off and the filtrate is concentrated under reduced pressure. Water is added to the residue, the separated oil is extracted with ether and the ether layer is shaken with 2.5% hydrochloric acid. The acid layer is made alkaline with aqueous sodium hydroxide. The free base is extracted again with ether and the ether layer is washed with water and then dried over anhydrous magnesium sulfate. The solvent is removed by distillation. 1-(β-diethylaminoethyl)-2-p-chlorophenylthio)benzimidazole is obtained as pale brown oil boiling at 192.0–196.0° C./0.5 mm. Hg. The yield amounts to 6.0 g. (61.8%). The dipicrate (M.P. 198.0–200.0° C.) is subjected to analysis with the following results:

Calcd. for $C_{31}H_{28}ClN_9O_{14}S$: 45.51% C, 3.45% H, 15.14% N. Found: 46.17% C, 3.50% H, 15.42% N.

By substituting 2-(p-bromophenylthio)benzimidazole prepared in Example 2 for 2-(p-chlorophenylthio)benzimidazole, there is obtained 1-(β-diethylaminoethyl)-2-(p-bromophenylthio)benzimidazole. The crude oily substance is purified by alumina (200 mesh) column chromatography with benzene. The yield is 33.0%. The dipicrate (M.P. 207.0–208/0° C.) is subjected to analysis with the following results:

Calcd. for $C_{31}H_{28}BrN_9O_{14}S$: 43.16% C, 3.27% H, 14.62% N. Found: 43.55% C, 3.43% H, 14.11% N.

Example 20.—1-(β-diethylaminoethyl)-2-(p-methylphenylthio)benzimidazole

In 150 ml. of hot anhydrous dioxane is dissolved 10 g. of 2-(p-methylphenylthio)benzimidazole prepared in Example 3, at a temperature of 60–70° C. To this solution is added 0.8 g. of sodium metal with stirring and the mixture is gradually heated to reflux. After refluxing overnight, the reaction mixture is cooled to 60–70° C., adding dropwise 5.5 g. of β-diethylaminoethylchloride in 45 ml. of toluene in the course of an hour and further stirring for 7 hours at 60–70° C. The resulting precipitate is removed by filtration, and the filtrate is concentrated under reduced pressure and then the residue is dissolved in ether. The ether solution is extracted with 5% hydrochloric acid and the acid layer is made alkaline and then the separated oil is extracted with ether. The ether layer is washed with water and dried over anhydrous magnesium sulfate. After removing the ether, the residue is distilled in vacuo. 1-(β-diethylaminoethyl) - 2 - (p-methylphenylthio)benzimidazole is obtained as pale yellow oil boiling at 185.0–187.0° C./0.16 mm. Hg. The yield amounts to 910 g. (63.4%). The dipicrate (M.P. 192.0–193.0° C.) is analyzed with the following results:

Calcd. for $C_{32}H_{31}N_9O_{14}S$: 43.18% C, 3.92% H, 15.80% N. Found: 48.03% C, 4.24% H, 15.64% N.

Similarly, the compounds of Examples 21 to 27 inclusive are obtained from the corresponding 2-(p-alkylphenylthio)benzimidazoles, as hereinbefore prepared, and β-diethylaminoethylchloride, respectively.

Example 21

From 2-(p-ethylphenylthio)benzimidazole, there is obtained 1 - (β - diethylaminoethyl)-2-(p-ethylphenylthio) benzimidazole boiling at 182.0–184.0° C./0.035 mm. Hg. The yield is 64.0%. The dipicrate (M.P. 194.0–195.0° C.) is analyzed with the following results:

Calcd. for $C_{33}H_{33}N_9O_{14}S$: 48.8% C, 4.10% H, 15.53% N. Found: 49.36% C, 4.33% H, 15.50% N.

Example 22

From 2-(p-propylphenylthio)benzimidazole, there is obtained 1-(β-diethylaminoethyl)-2-(p-propylphenylthio) benzimidazole boiling at 195.0–197.0° C./0.06 mm. Hg. The yield is 78.2%. The dipicrate (M.P. 178.0–179.5° C.) is analyzed with the following results:

Calcd. for $C_{34}H_{35}N_9O_{14}S$: 49.45% C, 4.27% H, 15.27% N. Found. 49.79% C, 4.49% H, 15.37% N.

Example 23

From 3-(p-isopropylphenylthio)benzimidazole, there is obtained 1 - (β-diethylaminoethyl)-2-(p-isopropylphenylthio)benzimidazole boiling at 186.0–191° C./0.5 mm. Hg. The yield is 45.5%. The dipicrate (M.P. 196.0–198.0° C.) is analyzed with the following results.

Calcd. for $C_{34}H_{35}N_9O_{14}S$: 49.45% C, 4.27% H, 15.27% N. Found: 50.07% C, 4.34% H, 14.90% N.

Example 24

From 2-(p-butylphenylthio)benzimidazole, there is obtained 1 - (β - diethylaminoethyl)-2-(p-butylphenylthio) benzimidazole boiling at 202.0–203.0° C./0.035 mm. Hg. The yield is 62.5%. The dipicrate (M.P. 214.5–215.0° C.) is analyzed with the following results:

Calcd. for $C_{35}H_{37}N_9O_{14}S$: 50.05% C, 4.44% H, 15.01% N. Found: 50.51% C, 4.08% H, 15.20% N.

Example 25

From 2-(p-isobutylphenylthio)benzimidazole, there is obtained 1 - (β - diethylaminoethyl)-2-(p-isobutylphenylthio)benzimidazole boiling at 196.0–199.0° C./0.12 mm. Hg. The yield is 44.5%. The dipicrate (M.P. 209.5–210.5° C.) is analyzed with the following results:

Calcd. for $C_{35}H_{37}N_9O_{14}S$: 50.05% C, 4.44% H, 15.01% N. Found: 50.27% C, 4.36% H, 14.95% N.

Example 26

From 2-(p-sec.-butylphenylthio)benzimidazole, there is obtained 1 - (β-diethylaminoethyl)-2-(p-sec.-butylphenylthio)benzimidazole boiling at 200.0–203.0° C./0.1 mm. Hg. The yield is 69.6%. The dipicrate (M.P. 207.0–207.5° C.) is analyzed with the following results.

Calcd. for $C_{35}H_{37}N_9O_{14}S$: 50.05% C, 4.44% H, 15.01% N. Found: 50.49% C, 4.50% H, 15.03% N.

Example 27

From 2-(p-tert.-butylphenylthio)benzimidazole, there is obtained 1 - (β-diethylaminoethyl)-2-(p-tert.-butylphenylthio)benzimidazole boiling at 190.0–196.0° C./0.14 mm. Hg. The yield is 59.0%. The dipicrate (M.P. 214.0–215.0° C.) is analyzed with the following results:

Calcd. for $C_{35}H_{37}N_9O_{14}S$: 50.05% C, 4.44% H, 15.01% N. Found: 50.61% C, 4.33% H, 14.84% N.

Example 28.—1-(β-diethylaminoethyl)-2-(p-methoxyphenylthio)benzimidazole

This compound is prepared from 10.3 g. of 2-(p-methoxyphenylthio)benzimidazole in Example 11, β-diethylaminoethylchloride (10.9 g.) and sodium amide (1.6 g.) by the same procedure as that described in Example 19, as pale yellow oil boiling at 192.0–194.0° C./0.12 mm. Hg. The yield amounts to 9.2 g. (67.8%). The dipicrate (M.P. 204.0–205.0° C.) is subjected to analysis with the following results:

Calcd. for $C_{32}H_{31}N_9O_{15}S$: 47.23% C, 3.84% H, 15.49% N. Found: 47.85% C, 4.03% H, 15.40% N.

The compounds of Examples 29 to 32 inclusive are obtained from the corresponding 2-(p-alkoxyphenylthio)benzimidazoles, prepared as hereinbefore described, and β-dialkylaminoethylchloride respectively:

Example 29

From 2-(p-methoxyphenylthio)benzimidazole and β-dimethylaminoethylchloride, there is obtained 1-(β-dimethylaminoethyl) - 2 - (p-methoxyphenylthio)benzimidazole boiling at 205.0–207.0° C./0.12 mm. Hg. The yield is 80.3%. The dipicrate (M.P. 227.5–228.0) is analyzed with the following results:

Calcd. for $C_{30}H_{27}N_9O_{15}S$: 45.86% C, 3.46% H, 16.05% N. Found: 45.56% C, 3.28% H, 16.50% N.

Example 30

From 2-(p-ethoxyphenylthio)benzimidazole and β-dimethylaminoethylchloride, there is obtained 1-(β-dimethylaminoethyl)-2-(p-ethoxyphenylthio)benzimidazole boiling at 175.0–177.0° C./0.12 mm. Hg. The yield is 70.6%. The dipicrate (M.P. 211.5–212.0° C.) is analyzed with the following results:

Calcd. for $C_{31}H_{29}N_9O_{15}S$: 46.56% C, 3.66% H, 15.77% N. Found: 46.58% C, 3.74% H, 16.04% N.

Example 31

From 2-(p-ethoxyphenylthio)benzimidazole and β-diethylaminoethylchloride, there is obtained 1-(β-diethylaminoethyl)-2-(p-ethoxyphenylthio)benzimidazole boiling at 209.0° C./0.13 mm. Hg. The oily product is dissolved in absolute ethanol, saturated with hydrogen chloride gas, and then ether is added to the above solution. The precipitated solid is crystallized from ethanol for obtaining the monohydrochloride of the desired compound as white grains melting at 168.5–175.0° C. The yield amounts to 10.3 g. (61.4%).

Analysis.—Calcd. for $C_{21}H_{28}ClN_3OS$: 61.12% C, 6.95% H, 10.35% N. Found: 61.50% C, 7.20% H, 10.32% N.

Example 32

From 2-(p-propoxyphenylthio)benzimidazole and β-diethylaminoethylchloride, there is obtained 1-(β-diethylaminoethyl)-2-(p-propoxyphenylthio)benzimidazole in the form of white needles melting at 53.5–54.5° C. The yield is 78.5%.

Analysis.—Calcd. for $C_{22}H_{29}N_3OS$: 58.95% C, 7.62% H, 10.96% N. Found: 69.20% C, 7.66% H, 10.64% N.

Example 33.—1-(β-diethylaminoethyl)-2-(p-N-methylaminophenylthio)benzimidazole In 30 ml. of ethanol is dissolved 4.2 g. of 2-(p-N-methylaminophenylthio)benzimidazole prepared as described in Example 14. To this solution is added 1.0 g. of potassium hydroxide in 50 ml. of ethanol, the solution refluxed for 3 hours and then evaporated in vacuo completely to dryness. The residual solid is suspended in 30 ml. of toluene, then adding dropwise 2.3 g. of β-diethylaminoethylchloride in 20 ml. of toluene during an hour with stirring and heating at 50–60° C. The reaction mixture is further stirred at 60–70° C. for 3 hours. After cooling, the reaction mixture is extracted with 2.5% hydrochloric acid. The acid layer is washed with ether to remove any trace of toluene and made alkaline with aqueous sodium hydroxide and then extracted again with ether. The ether layer is washed with water and dried over anhydrous magnesium sulfate. After removing the solvent by distillation, the residue is dissolved in absolute alcohol, and treated with an excess of dry hydrogen chloride and then diluted with ether. Upon crystallization of the precipitated solid from ethanol, there is obtained the trihydrochloride of the desired compound in the form of hygroscopic white needles as melting at 157.0–158.0° C. The yield amounts to 4.1 g. (54.9%).

Analysis.—Calcd. for $C_{20}H_{29}Cl_3N_4S$: 51.78% C, 6.30% H, 12.08% N. Found: 51.66% C, 6.62 % H, 12.04% N.

The compounds of Examples 34 to 37 inclusive are obtained from the corresponding 2-(p-aminophenylthio)benzimidazoles (prepared by the method described in Example 14 or 17) and β-diethylaminoethylchloride, respectively:

Example 34

From 2-(p-N - ethylaminophenylthio)benzimidazole, there is obtained 1-(β-diethylaminoethyl)-2-(p-N-ethylaminophenylthio)benzimidazole trihydrochloride, as white prisms melting at 148.0–149.5° C. The yield is 56.0%.

Analysis.—Calcd. for $C_{21}H_{31}Cl_3N_4S$: 52.77% C, 6.54% H, 11.72% N. Found: 52.66% C, 6.90% H, 11.58% N.

Example 35

From 2-(p-N - propylaminophenylthio)benzimidazole, there is obtained 1-(β-diethylaminoethyl)-2-(p-N-propylaminophenylthio)benzimidazole, as white needles melting at 69.5–70.5° C. The yield is 69.6%.

Analysis.—Calcd. for $C_{22}H_{30}N_4S$: 69.07% C, 7.90% H, 14.65% N. Found: 69.26% C, 7.33% H, 15.18% N.

Example 36

From 2-(p-N-dimethylaminophenylthio)benzimidazole, there is obtained 1-(β-diethylaminoethyl)-2-(p-N,N-dimethylaminophenylthio)benzimidazole monohydrochloride, as white needles melting at 206.0–207.0° C. The yield is 57.9%.

Analysis.—Calcd. for $C_{21}H_{29}ClN_4S$: 62.27% C, 7.22% H, 13.84% N. Found: 62.79% C, 6.95% H, 13.67% N.

Example 37

From 2-(p-N,N-diethylaminophenylthio)benzimidazole, there is obtained 1 - (β - diethylaminoethyl) - 2 - (p-N,N - diethylaminophenylthio)benzimidazole trihydrochloride monohydrate, as white prisms melting at 174.5–175.5° C. The yield is 64.1%.

Analysis.—Calcd. for $C_{23}H_{38}Cl_3N_4S \cdot H_2O$: 52.41% C, 7.65% H, 10.63% N. Found: 52.33% C, 7.90% H, 10.46% N.

Example 38.—1 - [β-(4-morpholino)-ethyl]-2-phenylthiobenzimidazole

In 60 ml. of hot anhydrous dioxane is dissolved 5 g. of phenylthiobenzimidazole prepared by the procedure of Example 1 using thiophenol in place of p-chlorothiophenol. The solution is treated portionwise with 1.5 g. of sodium amide at 60° C., and stirred for 2 hours at the same temperature. To this reaction mixture is added 5 g. of β-(4-morpholino)-ethylchloride dissolved in 20 ml. of dioxane during about an hour, and the mixture then heated at 75–80° C. for 3 hours. After cooling, the precipitated sodium chloride is filtered off, the filtrate is concentrated under reduced pressure. The residue is diluted with ether and the organic phase is extracated with 2.5% hydrochloric acid. The acid layer is made alkaline with sodium hydroxide solution and extracted again with ether. The ether extract is washed with water and dried over anhydrous magnesium sulfate. On removing the ether by distillation, the residue is crystallized. Recrystallization from ether-petroleum ether gives white prisms melting at 64.0–66.0° C. The yield is 40.0%.

*Analysis.*—Calcd. for $C_{19}H_{21}N_3OS$: 67.22% C, 6.24% H, 12.38% N. Found: 67.30% C, 5.92% H, 12.17% N.

The compounds of Examples 39 and 40 are obtained from the corresponding 2-(p-substituted-phenylthio)benzimidazoles and β-(4-morpholino)-ethylchloride, respectively by the method of this example:

*Example 39*

From 2-(p-chlorophenylthio)benzimidazole prepared in Example 1, there is obtained 1-[β-(4-morpholino)-ethyl]-2-(p-chlorophenylthio)benzimidazole in the form of white prisms melting at 79.0–80.0° C. The yield is 71.1%.

*Analysis.*—Calcd. for $C_{19}H_{20}ClN_3OS$: 61.03% C, 5.39% H, 11.24% N. Found: 61.01% C, 5.37% H, 11.65% N.

*Example 40*

From 2-(p-isopropylphenylthio)benzimidazole prepared as described in Example 6, there is obtained 1-[β-(4-morpholino)-ethyl] - 2 - (p-isopropylphenylthio)benzimidazole, as white needles melting at 118.0–120.0° C. The yield is 42.4%.

*Analysis.*—Calcd. for $C_{22}H_{27}N_3OS$: 69.25% C, 7.13% H, 11.01% N. Found: 68.99% C, 6.74% H, 11.33% N.

Having thus disclosed the invention, what is claimed is:
1. A compound of the formula:

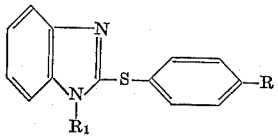

wherein R is a member selected from the group consisting of Cl, Br, lower alkyl, lower alkoxy, lower alkyl amino and a di(lower)alkyl amino, and $R_1$ is a member selected from the group consisting of di(lower)alkylaminoethyl and morpholinoethyl, 2. 1-(β-diethylaminoethyl)-2-phenylthiobenzimidazole.
3. 1-(β-diethylaminoethyl)-2-(p-chlorophenylthio) benzimidazole.
4. 1-(β-diethylaminoethyl)-2-(p-bromophenylthio) benzimidazole.
5. 1-(β-diethylaminoethyl)-2-(p-methylphenylthio) benzimidazole.
6. 1-(β-diethylaminoethyl)-2-(p-ethylphenylthio) benzimidazole.
7. 1-(β-diethylaminoethyl)-2-(p-propylphenylthio) benzimidazole.
8. 1-(β-diethylaminoethyl)-2-(p-isopropylphenylthio) benzimidazole.
9. 1-(β-diethylaminoethyl)-2-(p-butylphenylthio) benzimidazole.
10. 1-(β-diethylaminoethyl)-2-(p-isobutylphenyl) benzimidazole.
11. 1-(β-diethylaminoethyl)-2-(p-sec.-butylphenylthio) benzimidazole.
12. 1-(β-diethylaminoethyl)-2-(p-tert.-butylphenylthio)benzimidazole.
13. 1-(β-dimethylaminoethyl)-2-(p-methoxyphenylthio)benzimidazole.
14. 1-(β-dimethylaminoethyl)-2-(p-ethoxyphenylthio)benzimidazole.
15. 1-(β-diethylaminoethyl)-2-(p-methoxyphenylthio)benzimidazole.
16. 1-(β-diethylaminoethyl)-2-(p-ethoxyphenylthio)benzimidazole.
17. 1-(β-diethylaminoethyl)-2-(p-propoxyphenylthio)benzimidazole.
18. 1-(β-diethylaminoethyl)-2-(p-N-methylaminophenylthio(benzimidazole.
19. 1-(β-diethylaminoethyl)-2-(p-N-ethylaminophenylthio)benzimidazole.
20. 1-(β-diethylaminoethyl)-2-(p-N-propylaminophenylthio(benzimidazole.
21. 1-(β-diethylaminoethyl)-2-p-N,N-dimethylaminophenylthio)benzimidazole.
22. 1-(β-diethylaminoethyl)-2-(p-N,N-diethylaminophenylthio)benzimidazole.
23. 1-[β-(4-morpholino)-ethyl]-2-phenylthiobenzimidazole.
24. 1-[β-(4-morpholino)-ethyl]-2-(p-chlorophenylthio)benizimidazole.
25. 1-[β-(4-morpholino)-ethyl]-2-(p-isopropylphenylthio(benzimidazole.

References Cited

Nakajima et al., Chemical Abstracts, vol. 58, page 13,964 g. (1963).

ALEX MAZEL, *Primary Examiner.*

J. TOVAR, *Assistant Examiner.*